Dec. 30, 1924.
A. JUTILA
POTATO MASHER
Filed June 21, 1922
1,520,903
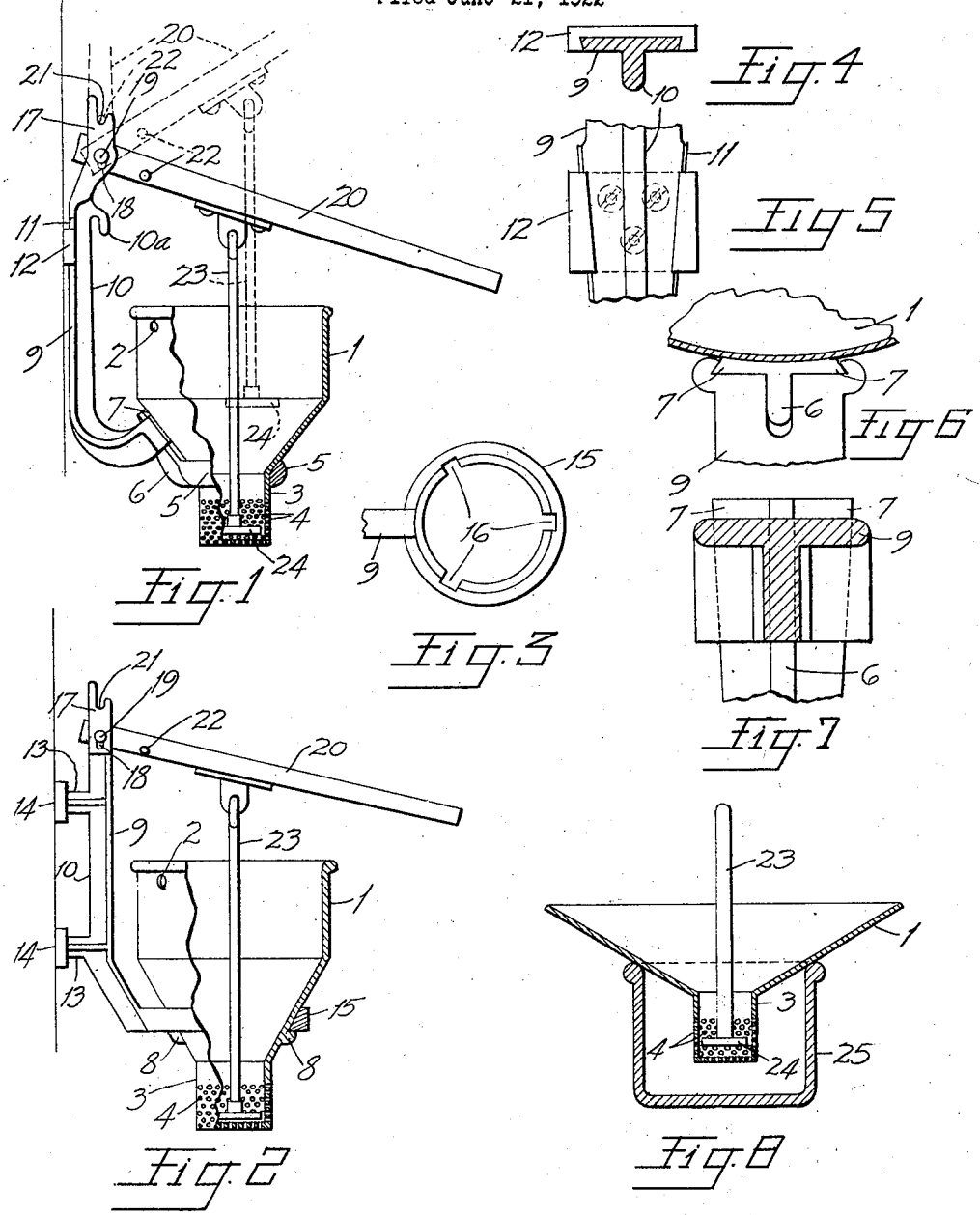
WITNESS:
C. L. Osgood
INVENTOR.
A. Jutila
BY
H. J. Sanders
ATTORNEY.

Patented Dec. 30, 1924.

1,520,903

UNITED STATES PATENT OFFICE.

ARTHUR JUTILA, OF CHICAGO, ILLINOIS.

POTATO MASHER.

Application filed June 21, 1922. Serial No. 569,832.

*To all whom it may concern:*

Be it known that I, ARTHUR JUTILA, a citizen of Finland, residing at Chicago, in the county of Cook and State of Illinois, have invented certain new and useful Improvements in Potato Mashers, of which the following is a specification.

This invention relates to improvements in potato mashers and its object is to provide a simple device of this class that is practical and efficient in operation. With the foregoing and other objects in view the invention consists in the combination and arrangement of parts to be hereinafter fully described, pointed out in the appended claims and illustrated in the accompanying drawing which forms a part of this application and in which—

Fig. 1 is a view in side elevation, partly in section, of the device, the dotted lines denoting altered positions of the movable parts.

Fig. 2 is a similar view of a slightly modified form of the device.

Fig. 3 is a fragmentary view of Fig. 2 illustrating the supporting ring employed.

Fig. 4 is a fragmentary view of Fig. 1 illustrating the supporting arm and bracket therefor.

Fig. 5 is a front view of Fig. 4.

Fig. 6 is a fragmentary view of Fig. 1 showing the lower part of the supporting arm and the manner in which it holds the container.

Fig. 7 is a view of Fig. 6 in elevation.

Fig. 8 is a sectional view of a modified form of the device intended for family use.

Like reference characters denote corresponding parts throughout the several views.

The masher, for hotel or restaurant use, comprises a bowl 1 formed near its upper edge with a small perforation 2, so that it may be hung on a nail or hook when not in use, the lower bowl portion being contracted and terminating in the closed end 3 formed with the perforations 4. The bowl may be formed about its contracted portion with the bead 5 from which the ribs 6 extends that is provided with the lateral wings 7, as shown in Fig. 1, or it may be formed with the spaced lugs 8 as shown in Fig. 2, the lugs are preferably three in number and spaced at equal distances from each other about the periphery of the bowl, all three being in a common plane.

I provide an angular supporting arm 9 which is formed with an integral rib 10; referring now only to Figs. 1, 4, 5, 6 and 7, the lower curved end of the said arm being recessed to permit its frictional engagement with the rib and wings, 6, 7, the wings 7 widening as they recede from the bead 5. When the arm is in supporting engagement with the said rib and wings 6, 7 the weight of the bowl tends to wedge said members together, and in order to separate them it is necessary to manually raise the bowl, perhaps giving it a sharp jerk, to loosen it from said arm. The arm 9 is formed with the widened portion 11 which tapers downwardly and is adapted to seat in the grooved bracket 12 which is secured by nails or screws to the wall or other support. The rib 10 is formed with a hook 10$^a$ to permit it to be suspended from a nail when not in use. The arm 9 shown in Figs. 2 and 3 has its ribs 10 formed with extensions 13 which carry brackets 14 which are secured to the wall. The lower end of this arm terminates in the ring 15 formed with the recesses 16 spaced to receive the lugs 8 of the bowl which lugs pass through said recesses and by manually turning the bowl until the lugs pass beyond said recesses withdrawal of the bowl is possible.

The arm 9 is formed with one bifurcated end 17 in which an elongated slot 18 is formed that receives the pin 19 carried by the lever 20, one of the sides of the bifurcated portion of the arm 9 being extended and formed with the groove 21 adapted, in one position of the lever 20 shown in Fig. 1, to receive the pin 22 carried by said lever whereby said lever may be retained in an out of the way inoperative position. The lever 20 carries the plunger rod 23 having the flat round head 24 adapted to snugly fit inside the contracted perforated end of the bowl. When the potatoes are placed in the bowl the lever 20 is oscillated upon its pin 18 thus causing the head 24 to mash the potatoes and force them out through the perforations 4. In Fig. 8 a potato masher for family use is shown. A dish 25 is used to support the bowl 1. The plunger 23 is operated by hand and the mashed potatoes drop into the dish 25.

What is claimed is:—

1. In a potato masher, a bowl having one contracted perforated end, a supporting arm for said bowl, said arm being formed with one notched extremity, a lever fulcrumed to said arm, a pin carried by said lever, said pin, in one position of said lever, being disposed in the notched end of said lever to retain said members in adjusted relation, and a plunger carried by said lever.

2. In a potato masher, a bowl having one contracted perforated end, a bead formed upon the contracted portion of said bowl, a winged rib extending from said bead, the wings of said rib widening as they recede from said bead, a supporting arm having one grooved end for frictional engagement with the wings and rib, a lever fulcrumed to said arm, and a plunger carried by said lever and disposed in said bowl.

In testimony that I claim the foregoing as my own I have hereto affixed my signature in the presence of two subscribing witnesses.

ARTHUR JUTILA.

Witnesses:
HUBERT REMSLAY,
FRANK A. STACHOWICZ.